United States Patent [19]
Krainer et al.

[11] Patent Number: 5,568,040
[45] Date of Patent: Oct. 22, 1996

[54] CHARGING ARRANGEMENT FOR THE TIME-CONTROLLED CHARGING OF AT LEAST ONE RECHARGEABLE CELL

[75] Inventors: Erich Krainer; Martin Sonnek, both of St. Veit an der Glan, Austria

[73] Assignee: U.S. Philips Corporation, New York, N.Y.

[21] Appl. No.: 308,769

[22] Filed: Sep. 19, 1994

[30] Foreign Application Priority Data

Sep. 30, 1993 [AT] Austria ................................ 1967/93

[51] Int. Cl.$^6$ .................................................. H02J 7/04
[52] U.S. Cl. ................................ 320/37; 320/31; 320/21
[58] Field of Search ........................... 320/20–24, 35–38, 320/39, 31

[56] References Cited

U.S. PATENT DOCUMENTS 4,554,500  11/1985  Sokira ........................... 320/31
5,397,991  3/1995  Rogers ........................... 320/48
5,422,560  5/1995  Yan ................................ 320/31

OTHER PUBLICATIONS

Feb. 1988 issue of the Dutch magazine "Elektuur", pp. 74 to 79.

*Primary Examiner*—Peter S. Wong
*Assistant Examiner*—Aditya Krishnan
*Attorney, Agent, or Firm*—Bernard Franzblau

[57] ABSTRACT

Apparatus for the time controlled charge of a battery includes a switching device to control the supply of charge current to the battery. The switching device is in turn controlled by a control device including a time signal generation stage having a temperature sensitive device responsive to the ambient temperature of the apparatus so as to adjust the time signal generation stage to alter the battery charge time in a sense to prevent overcharging of the battery.

13 Claims, 3 Drawing Sheets

CHARGING ARRANGEMENT FOR THE TIME-CONTROLLED CHARGING OF AT LEAST ONE RECHARGEABLE CELL

BACKGROUND OF THE INVENTION

This invention relates to a charging arrangement for the time-controlled charging of at least one rechargeable cell, comprising a supply device which enables a charging current to be supplied to the at least one rechargeable cell, a switching device which enables the charging current supplied to the at least one rechargeable cell to be started and stopped, and a control device provided to control the switching device and comprising a time signal generation stage which, expiration of a time interval after the beginning of a charging current supply, supplies a time signal which controls the switching device so as to stop the supply of charging current.

A charging arrangement of the type defined in the opening paragraph is known in different variants and is described in, for example, the February 1988 issue of the Dutch magazine "Elektuur", pages 74 to 79. In the known circuit arrangements the time signal generation stage supplies the time signal to terminate a charging current supply to a rechargeable cell upon the expiration of a time interval after the beginning of a charging current supply, which time interval may be adjustable by hand but otherwise always remains the same. Consequently, all of the charging operations are ended after a given constant charging time. The charging time may be, for example, eight hours, and the charging current may then have a value between 0.1 C and 0.3 C. By means of the known charging arrangements nickel-cadmium batteries (NiCd batteries), whose charging characteristics are substantially independent of the ambient temperature, can be charged without any problems but this is not so in the case of batteries such as nickel-metal-hydride batteries (NiMH batteries), whose charging characteristics depend comparatively strongly on the ambient temperature.

SUMMARY OF THE INVENTION

It is an object of the invention to construct and improve a charging arrangement of the type defined in the opening paragraph in a manner such that batteries, such as NiMH batteries, whose charging characteristics are dependent on the ambient temperature, can be charged without any problems. To this end the invention is characterised in that the time signal generation stage comprises a temperature measurement device for measuring the ambient temperature of the charging arrangement, which temperature measurement device in the case of a variation of the ambient temperature controls the time signal generation stage for the time-shifted supply of the time signal to stop the supply of charging current supply after the beginning of this charging current supply. Thus, it is achieved that the charging time, in which the at least one cell is charged by applying a charging current, is automatically adapted to the ambient temperature of the cell by particularly simple means. In the case where an NiMH battery is to be charged, whose charge-storage capacity decreases distinctly at increasing temperature, the charging time is reduced automatically as the ambient temperature increases, which simply precludes overcharging of such a battery at increasing ambient temperature and a consequent reduction of the life span of such a battery. In the case of a battery whose charge-storage capacity increases at increasing temperature, the charging time is prolonged automatically as the temperature increases, so that in the case of an increasing ambient temperature such a battery is always charged to an optimum extent.

It has proved to be advantageous for the time signal generation stage to comprise an oscillator for generating an oscillator signal, which oscillator includes the temperature measurement device as a frequency-determining element, and a counting circuit adapted to count the periods of the oscillator signal and following the oscillator, which counting circuit upon reaching a given count initiates the supply of the time signal to stop the supply of the charging current. Such a charging arrangement, in which the time signal generation stage consists of an oscillator followed by a counting circuit, is cheap and reliable and enables even long charging times, for example, of approximately eight hours, to be defined in an accurate and reliable manner.

In this respect it has proved to be particularly advantageous to provide the time signal generation stage with a resistor with a negative temperature coefficient as the temperature measurement device. This is advantageous for a low-cost construction of the temperature measurement device and, as a consequence, of the charging arrangement.

BRIEF DESCRIPTION OF THE DRAWING

The invention will now be described in more detail with reference to three exemplary embodiments to which the invention is not limited.

DESCRIPTION OF THE PREFERRED EMBODIMENTS

Figure 1:
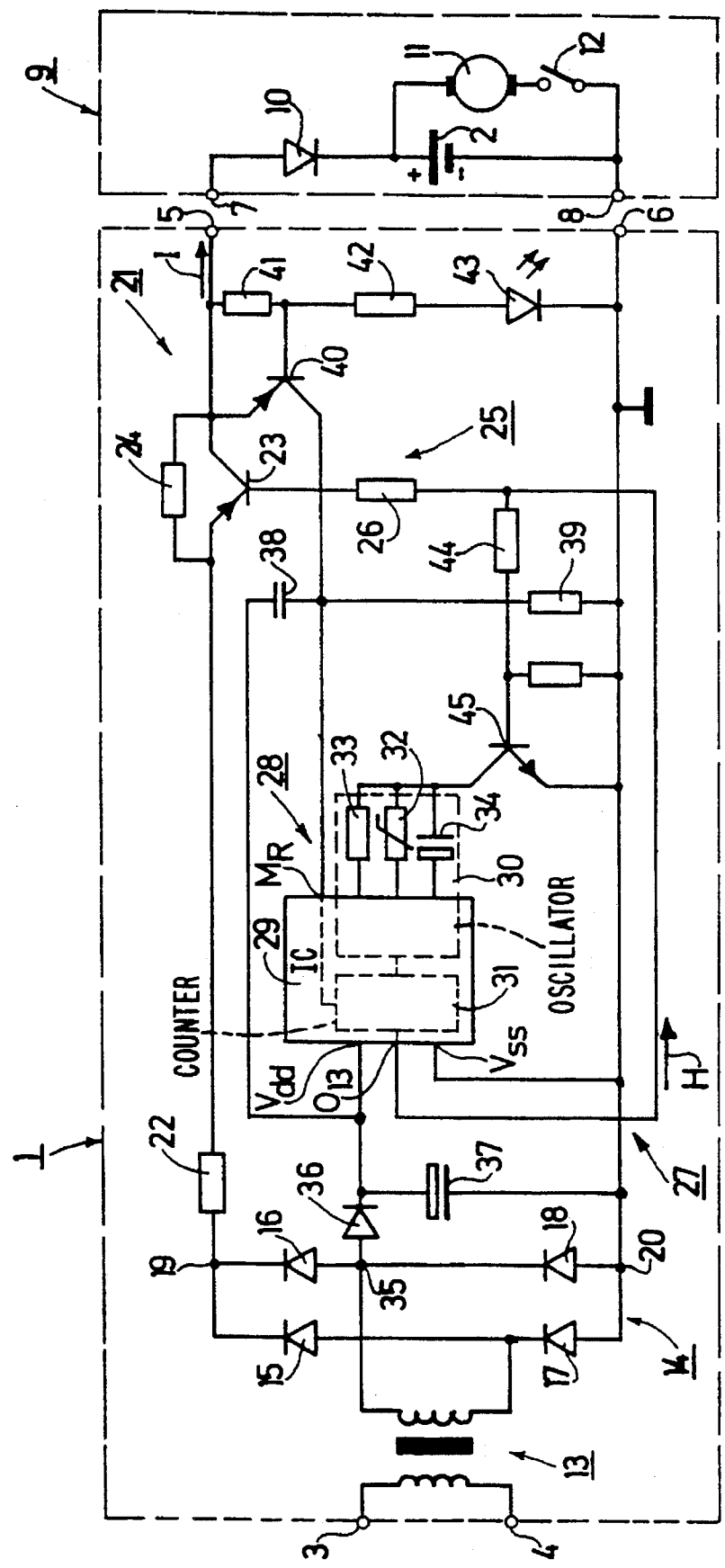
FIG. 1 shows a charging arrangement forming a first embodiment of the invention and comprising a supply device provided to supply a charging current to a rechargeable cell, which supply device is basically formed by a transistor stage and which partly also serves as a switching device for turning on and turning off a charging current supply to the cell.

FIG. 1 shows a charging arrangement 1 for the time-controlled charging of at least one rechargeable cell, in the present case formed by an NiMH battery 2. The charging arrangement 1, which is accommodated in a separate charging apparatus or a separate charging device, has two input terminals 3 and 4 for the connection of the charging arrangement 1 to an alternating voltage mains, and two output terminals 5 and 6. The two output terminals 5 and 6 serve the connection of two input terminals 7 and 8 of an apparatus 9 to be connected to the charging device which includes the charging arrangement, which apparatus is, for example, a shaver, a depilatory device or the like. The apparatus 9 contains the NiMH battery 2, which in series with a short-circuit protection diode 10 is arranged between the two input terminals 7 and 8. The protection diode 10 prevents the battery 2 from being drained inadvertently in the event that the input terminals 7 and 8 are short-circuited. A motor 11 in series with a switch 12 is arranged in parallel with the battery 2. The motor 11 serves for driving a mechanism of the apparatus 9. The switch 12 serves for switching on the motor 11.

A mains transformer 13 is connected to the two input terminals 3 and 4 of the charging arrangement 1 and is followed by a bridge rectifier circuit 14 comprising four diodes 15, 16, 17 and 18. A supply device 21 is connected to the two outputs 19 and 20 of the bridge rectifier circuit 14 to apply a charging current I to the battery 2. This charging current I may have a value in the range from 0.1 C to 0.3 C, C representing the numerical value of the storage capacity of the battery 2 in ampere-hours (Ah). The supply device 21 has a resistor 22 connected to the output 19 of the bridge rectifier circuit 14 and a transistor 23 whose emitter-collector path is arranged in series with the resistor 22, a further resistor 24 being arranged in parallel with said emitter-collector path. The further resistor 24 is provided to sustain a trickle-charge mode after termination of a regular charging process, the trickle-charge serving to compensate for self-discharging of the battery 2.

The charging arrangement 1 further comprises a switching device 25 by means of which the supply of charging current to the battery 2 can be started and ended. In the present case the switching device 25 is formed by means of the transistor 23, which also forms a part of the supply device 21. To turn on and turn off the switching device 25 a switching signal can be applied to the base of the transistor 23 of the switching device 25 via a resistor 26 of the switching device 25.

The charging arrangement 1 further comprises a control device 27 for controlling the switching device 25. The control device 27 comprises a time signal generation stage 28 which supplies a time signal H upon expiration of a time interval T after the beginning of a charging current supply, which time signal controls the switching device 25 so as to stop the supply of charging current. In the present case the time signal H then has a high level and directly forms the switching signal which can be applied to the base of the transistor 23 via the resistor 26 in order to turn off this transistor. However, before it is applied to the switching device 25, the time signal may also be passed through an amplifier stage for amplification or adaptation of its level.

In the present charging arrangement 1 the time signal generation stage 28 is constructed by means of an integrated circuit 29 (IC 29) which is commercially available under type number HEF4060. This IC 29 forms an oscillator 30 for generating an oscillator signal and a counting circuit 31 which follows the oscillator 30 and serves to count the number of periods of the oscillator signal. The counting circuit initiates the supply of the time: signal H to stop the supply of charging current when a given count is reached. The IC 29 supplies the time signal H on an output $O_{13}$ of this IC 29. As already stated, the time signal H is a signal having a high level, which is applied to the base of the transistor 23 via the resistor 26 as a switching signal to turn off the transistor 23.

In the present charging arrangement 1 the time signal generation stage 28 includes a temperature measurement device 32 for measuring the ambient temperature of the charging arrangement 1. In the case of a variation of the ambient temperature of the charging arrangement 1, the device 32 controls the time signal generation stage 28 to time-shift the supply of the time signal H for terminating the charging current supply after the beginning of this charging current supply. In the present charging arrangement 1 the temperature measurement device 32 is responsive to an increase in ambient temperature to control the time signal generation stage 28 for an earlier supply of the time signal H. To measure the ambient temperature of the charging arrangement 1 the temperature measurement device 32 is arranged at a suitable location.

The temperature measurement device 32 of the time signal generation stage 28 is a resistor with a negative temperature coefficient. This resistor 32 forms a frequency-determining part of the oscillator 30. In addition to the NTC resistor 32 the oscillator 30 comprises a resistor 33 of fixed resistance value and a capacitor 34.

A diode 36 connected to an output terminal 35 of the mains transformer 13 supplies a rectified output voltage which is stored in a storage and smoothing capacitor 37. This voltage forms the supply voltage for the IC 29 and is applied to the terminals $V_{dd}$ and $V_{ss}$ of the IC 29.

The IC 29 also has a reset input $M_R$ connected to the node between the diode 36 and the capacitor 37 and the terminal $V_{dd}$ of the IC 29 via a capacitor 38. The capacitor 38 is connected to ground via a resistor 39. When the charging arrangement 1 is connected to a supply mains, a positive reset pulse is applied to the reset input $M_R$ of the IC 29 via the capacitor 38, as a result of which the time counting stage 31 is set to zero. Subsequently, the capacitor 38 is charged, which pulls the reset input $M_R$ to a low potential, which enables the counting circuit 31 to count the periods of the oscillator signal generated by the oscillator 30.

A transistor 40 has its collector connected to the reset input $M_R$ of the IC 29 and has its base connected to the output terminal 5 via a resistor 41 and to the output terminal 6 of the circuit arrangement 1 via the series connection of a resistor 42 and a light-emitting diode 43 (LED 43). The transistor 40 serves to monitor the output voltage of the charging arrangement 1. When an apparatus 9 is connected to the charging arrangement 1 a comparatively low voltage will appear across the output terminals 5 and 6, so that the transistor 40 is cut off and, consequently, a low potential appears on the reset input $M_R$. This enables the oscillator 30 and the counting circuit 31 to operate if the charging arrangement 1 is connected to the mains. When the apparatus 9 is disconnected from the charging arrangement 1 a comparatively high voltage will appear across the output terminals 5 and 6, so that the transistor 40 is turned on and, consequently, the reset input $M_R$ is pulled to a high potential, as a result of which the counting circuit 31 is reset when the apparatus is unplugged from the charging arrangement 1.

When the IC 29 supplies the time signal H with a high level on its output $O_{13}$, which is effected after $2^{13}$ periods of the oscillator signal generated by the oscillator 30, the time signal. H will influence not only the transistor 23 but, via a resistor 44, also a further transistor 45 arranged between the oscillator 30 and ground. The time signal H, which turns off the transistor 23, drives the transistor 45 into conduction, as a result of which the oscillator is blocked. As a consequence, the oscillator 30 and the counting circuit 31 are stopped, so that the oscillator 30 ceases to oscillate and the counting circuit 31 cannot count further after the supply of the high-level time signal H and does not supply a low-level time signal L after $2^{13}$ further periods of the oscillator signal, which would result in a new charging process because the transistor 23 would be turned on by the low-level time signal L.

If, with the apparatus 9 connected, the charging arrangement 1 is connected to a supply mains with its input terminals 3 and 4, voltage is supplied to the terminals $V_{dd}$ and $V_{ss}$ of the IC 29 via the diode 36 and the capacitor 37 and, moreover, a reset pulse is applied to the reset input $M_R$ to reset the counting circuit 31, as a result of which the IC 29 supplies a low-level time signal on its output $O_{13}$. Thus, it is achieved that the oscillator 30 oscillates and the counting circuit 31 counts, a charging current I being fed to the battery 2 via the transistor 23. This charging current I flows until the counting circuit 31 reaches a given count corresponding to a given number of periods of the oscillator signal, i.e. $2^{13}$ periods, and hence to a given charging time. By a suitable choice of the period of the oscillator signal this charging time can be adjusted to approximately eight hours at an ambient temperature of the battery 2 of approximately 20° Centigrade. At an ambient temperature of 20° Centigrade the counting circuit 31 will then supply a high-level time signal H after approximately eight hours, which signal turns off the transistor 23, thereby terminating a charging process after this charging time of eight hours, and which turns on the transistor 45, thereby stopping the oscillator 30 and the counting circuit 31.

However, in the case of a higher ambient temperature of the charging arrangement 1, this higher ambient temperature is detected by the resistor 32, as a result of which the frequency of the oscillator signal is increased in the present case, i.e. the period of the oscillator signal is reduced. Consequently, the count of $2^{13}$ is reached earlier and the counting circuit 31 supplies the high-level time signal H for terminating a charging process at an earlier instant. Thus, when the ambient temperature increases the charging time is reduced, which precludes overcharging of the NiMH battery 2 and a consequent reduction of the life span of this NiMH battery 2.

It is to be noted that by lighting up the LED 43 indicates that the charging arrangement 1 is ready to charge a battery 2. The LED 43 lights up when the input terminals 3 and 4 of the charging arrangement I are connected to a supply mains.

Figure 2:
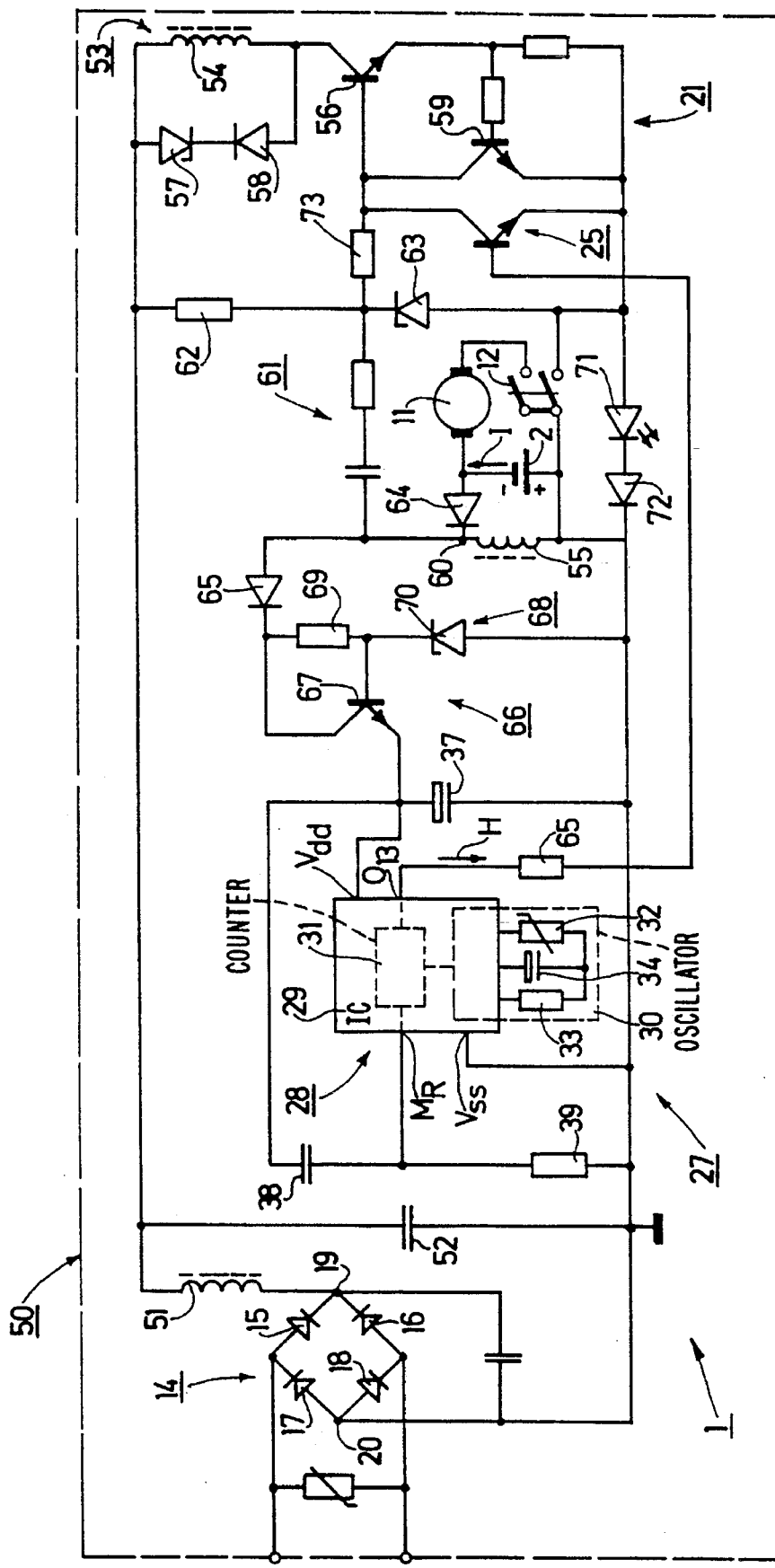
FIG. 2 shows a charging arrangement forming a second embodiment of the invention and comprising a supply device for the supply of a charging current to a rechargeable cell, which supply device is formed by a switched-mode power supply.

FIG. 2 shows a circuit arrangement 50 of an apparatus, for example, a hair trimmer. The circuit arrangement 50 comprises a charging arrangement 1 for the time-controlled or time-limited charging of a cell, which in the present case is again formed by an NiMH battery 2. The charging arrangement 1 also comprises a bridge rectifier circuit 14 whose output voltage is applied to a storage capacitor 52 via an HF interference suppression choke 51.

As a supply device 21, by means of which a charging current I can be applied to the battery 2, the charging arrangement 1 comprises a switched-mode power supply connected to the storage capacitor 52. The switched-mode power supply 21 is of known conventional construction and basically comprises a transformer 53 having a primary winding 54 and, inductively coupled thereto, a secondary winding 55, a switching transistor 56 in series with the primary winding 54, a diode combination arranged in parallel with the primary winding 54 and comprising a zener diode 57 and an oppositely poled diode 58 to drain the energy stored in the stray inductance of the primary winding 54, a control transistor 59 for controlling the switching transistor 56, an RC element 61 arranged, between a terminal 60 of the secondary winding 55 and the base circuit of the switching transistor 56 to provide feedback from the secondary winding 55 to the base of the switching transistor 56, a starting resistor 62 coupled to a point between the RC element 61 and the base resistor 73 of the switching transistor 56, a zener diode 63 for limiting the maximum base current of the switching transistor 56 in conjunction with the base resistor 73, and finally a charging diode 64 connected to the terminal 60 of the secondary winding 55, via which charging diode a charging current I can be applied to the battery 2.

The charging arrangement 1 comprises a switching transistor to form the switching device 25 by means of which the charging current supply to the battery 2 can be turned on and turned off. The switching transistor 25 has its emitter-collector path arranged in parallel with the emitter-collector path of the control transistor 59. The switching transistor 25 can be turned on by applying a high-level time signal H as a switching signal to the switching transistor 25 via a base resistor 65. This turns off the switched-mode power supply 21 and thereby stops the supply of charging current to the battery 2.

To control the switching device 25 the charging arrangement 1 has a control device 27 with a time signal generation stage 28 whose construction substantially corresponds to that in the charging arrangement 1 shown in FIG. 1. The only difference is that the supply voltage for the IC 29 is generated in another way. For this purpose a diode 65 is connected to the terminal 60 of the secondary winding 55 and its output voltage is applied to a storage capacitor 37 via a transistor stage 66 with a transistor 67 whose base voltage divider 68 comprises a resistor 69 and a zener diode 70, the terminals of the storage capacitor being connected to the supply terminals $V_{dd}$ and $V_{ss}$ of the IC 29.

The charging arrangement 1 further comprises two series-connected diodes 71 and 72, the diode 71 being a light-emitting diode (LED). This LED 71 serves to indicate the mode in which a battery 2 is charged, which is effected by the LED 71 lighting up.

Figure 3:
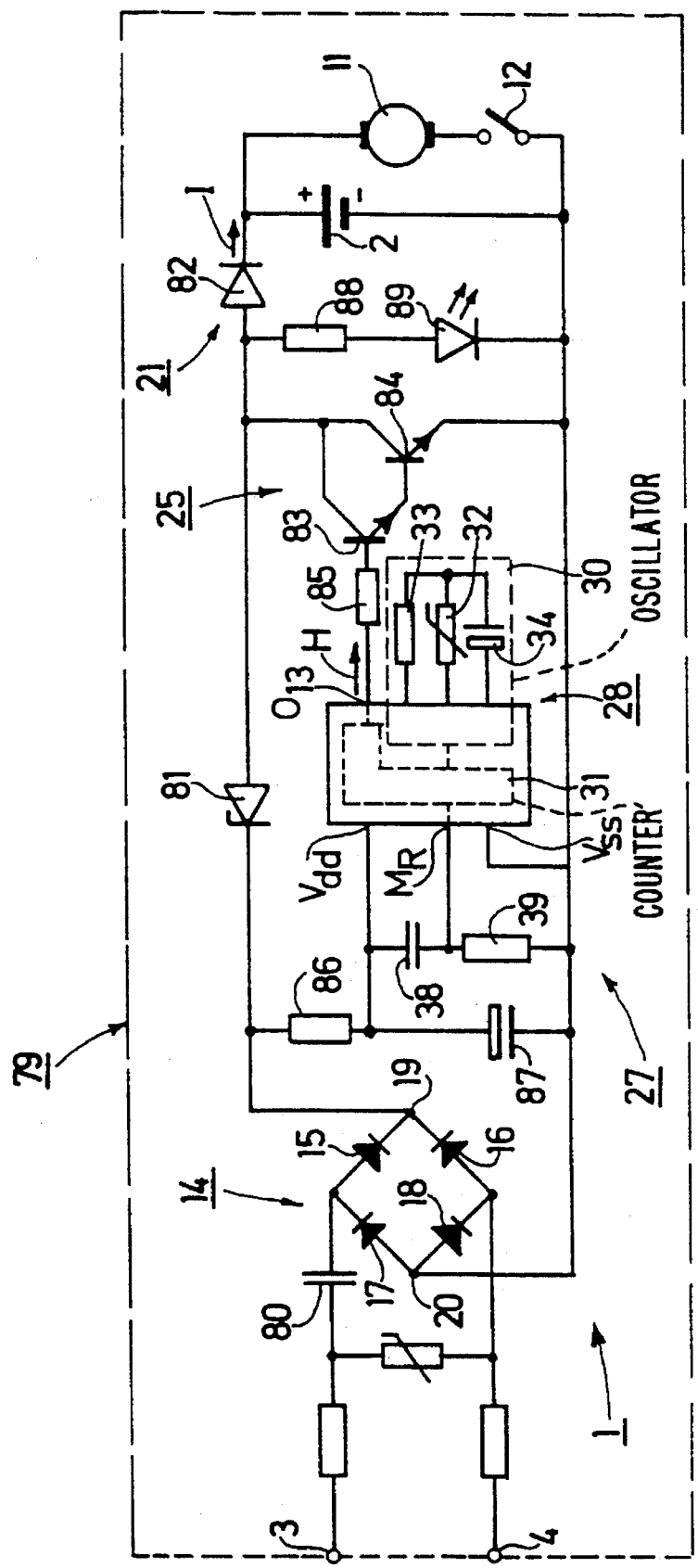
FIG. 3 shows a charging arrangement forming a third embodiment of the invention and comprising a supply device for the supply of a charging current to a rechargeable cell, which supply device is basically formed by a diode.

FIG. 3 shows a circuit arrangement 79 of an apparatus, for example, a shaver or a hair trimmer. The circuit arrangement 79 comprises a charging arrangement 1 for the time-controlled or time-limited charging of a cell, which in the present case is again formed by an NiMH battery 2. The charging arrangement 1 also comprises a bridge rectifier circuit 14 arranged in series with a capacitor 80 in order to generate a constant current.

The charging arrangement 1 comprises a supply device 21 by means of which a charging current I can be applied to the battery 2. The supply device 21 has a zener diode 81 connected to the output 19 of the bridge rectifier stage 14 to generate a supply voltage for the control device 27, and a charging diode 82 arranged in series with the zener diode 81, to apply a charging current I to the battery 2.

As before, the charging arrangement 1 comprises a switching device 25 by means of which the charging current supply to the battery 2 can be turned on and turned off. In the present charging arrangement 1 the switching device 25 comprises two transistors 83 and 84 arranged one after the other. A control signal formed by a high-level time signal H can be applied to the base of the transistor 83 via a series resistor 85. The time signal H turns on the transistor 83 and, consequently, the transistor 84, so that after expiration of a given charging tithe the transistor 84 constitutes a short-circuit, as a result of the supply of charging current to the battery 2 is stopped and remains inhibited.

To control the switching device 25 the charging arrangement 1 has a control device 27 with a time signal generation stage 28, whose construction substantially corresponds to that in the charging arrangement 1 shown in FIGS. 1 and 2. The only difference is that the supply voltage for the IC 29 is generated in another way. For this purpose, as already stated, the zener diode 81 is connected to the output 19 of the bridge rectifier circuit 14 and, moreover, to a resistor 86 in series with a storage capacitor 87 arranged between the output terminals 19 and 20 of the bridge rectifier circuit 14. The terminals of the storage capacitor 87 are connected to the supply terminals $V_{dd}$ and $V_{ss}$ of the IC 29.

The charging arrangement I further comprises a series connection of a load resistor 88 and a light-emitting diode 89 (LED 89) arranged in parallel with the emitter-collector path of the transistor 84 to indicate whether the supply of charging current to the battery 2 proceeds or has ended. As long as charging current is supplied the LED 89 is lit. After termination of the charging current supply via the short-circuit by means of the transistor 84, the LED 89 is turned off, which indicates the end of a charging process.

The two charging arrangements 1 of the two circuit arrangements 50 and 79 as shown in FIGS. 2 and 3, respectively can also be set to a charging time of, for example, eight hours at an ambient temperature of approximately 20° Centigrade by a suitable choice of the period of the oscillator signals supplied by the oscillators 30. At an ambient temperature of 20° Centigrade the counting circuits 31 then supply the time signals H after $2^{13}$ periods of the oscillator signals, so that a charging process is terminated after a charging time of eight hours. However, the charging time may also differ from eight hours.

In the case of a higher ambient temperature of the charging arrangements 1 shown in FIGS. 2 and 3, this higher ambient temperature is detected by the resistor 32 provided as the temperature measurement device, causing the frequency of the oscillator signals supplied by the oscillator 30 to be increased, i.e. the period of the oscillator signals to be reduced. As a result, the count of $2^{13}$ is reached sooner and, consequently, the counting circuits 31 supply the high-level time signals H for terminating a charging process at an earlier instant. Thus, the charging time is reduced at increasing ambient temperature, which precludes overcharging of the NiMH battery 2 and a consequent reduction of the life span of this NiMH battery 2.

The invention is not limited to the three exemplary embodiments described hereinbefore. Many other variants are possible with respect to the construction of the supply device, the switching device as well as the control device with the time signal generation stage. A time signal generation stage can, for example, also be realised by means of a microcomputer.

We claim:

1. A charging arrangement for the time-controlled charging of at least one rechargeable cell, comprising: a supply device which enables a charging current (I) to be supplied to the at least one rechargeable cell, a switching device which allows the flow of a charging current to the at least one rechargeable cell to be started and stopped, and a control device which controls the switching device and comprises a time signal generation stage which, upon expiration of a time interval after a beginning of the flow of a charging current, supplies a time signal (H) which controls the switching device so as to stop the flow of charging current, wherein the time signal generation stage comprises a temperature measurement device for measuring the ambient temperature of the charging arrangement, wherein the temperature measurement device, in the case of a variation of the ambient temperature, controls the time signal generation stage for the time-shifted supply of the time signal (H) to stop the flow of charging current to the at least one rechargeable cell as a function of said ambient temperature.

2. A charging arrangement as claimed in claim 1, wherein the time signal generation stage comprises an oscillator for generating an oscillator signal and the oscillator includes the temperature measurement device as a frequency-determining element, and a counting circuit coupled to the oscillator so as to count the periods of the oscillator signal, wherein said counting circuit, upon reaching a given count, initiates the supply of the time signal (H) to stop the flow of charging current.

3. A charging arrangement as claimed in claim 2 wherein the time signal generation stage comprises a resistor with a negative temperature coefficient as the temperature measurement device.

4. A charging arrangement as claimed in claim 1, wherein the time signal generation stage comprises a resistor with a negative temperature coefficient as the temperature measurement device.

5. A charging arrangement as claimed in claim 1 wherein said at least one rechargeable cell is a part of a nickel-metal-hydride (NiMH) battery.

6. A charging arrangement as claimed in claim 1 wherein said temperature measurement device comprises a negative temperature coefficient resistor responsive to the ambient temperature so as to automatically vary, by means of the time signal generation stage, the charging time of the at least one rechargeable cell as a function of the ambient temperature.

7. A charging arrangement as claimed in claim 2 further comprising a switching transistor coupled to an output of the charging arrangement so as to monitor the output voltage thereof, said switching transistor being responsive to an increase in the output voltage when a rechargeable cell is disconnected from the output of the charging arrangement so as to derive a control voltage to reset the counting circuit.

8. A charging arrangement as claimed in claim 2 further comprising means responsive to the time signal for blocking the operation of said oscillator.

9. A charging arrangement as claimed in claim 2 wherein said at least one rechargeable cell is a part of a nickel-metal-hydride (NiMH) battery and, as the ambient temperature increases, the oscillator frequency is increased so as to reduce the charging time of the NiMH battery.

10. A charging arrangement as claimed in claim 1 wherein said switching device comprises a switching transistor which is part of a switched mode power supply, and further comprising an RC feedback circuit coupling an output of the charging arrangement to a control electrode of said switching transistor.

11. A battery charger apparatus comprising:
    an output terminal for connection to a battery to be charged by the battery charger apparatus,
    a supply device for the supply of a charge current to a connected battery via said output terminal,
    said supply device including a switching device coupled to said output terminal to control the supply of a charge current thereto, and
    a control device which controls the operation of the switching device and comprises a time signal generation stage which includes a temperature sensitive device responsive to the ambient temperature of the battery charger apparatus so that the time signal generation stage derives a time signal which controls the switching device so as to automatically vary the length of time during which the charge current flows to said output terminal as a function of said ambient temperature.

12. The battery charger apparatus as claimed in claim 11 wherein said temperature sensitive device comprises a negative temperature coefficient resistor and said time signal generation stage includes an oscillator generating a signal with a continuously variable frequency and whose frequency is controlled by the negative temperature coefficient resistor in a sense to prevent an overcharge of a battery when connected to said output terminal.

13. The battery charger apparatus as claimed in claim 11 wherein said temperature sensitive device is located at a sufficient distance from the battery so as to be insensitive to the battery temperature.

* * * * *